US012770905B2

(12) United States Patent
Qi et al.

(10) Patent No.: US 12,770,905 B2
(45) Date of Patent: Oct. 20, 2026

(54) STACKING APPARATUS

(71) Applicant: Guangdong Lyric Robot Automation Co., Ltd., Guangdong (CN)

(72) Inventors: Hong Qi, Guangdong (CN); Junxiong Zhou, Guangdong (CN); Junjie Zhou, Guangdong (CN); Haisheng Cai, Guangdong (CN); Xiaotao Xu, Guangdong (CN); Yifeng Wang, Guangdong (CN)

(73) Assignee: GUANGDONG LYRIC ROBOT AUTOMATION CO., LTD., Guangdong (CN)

( * ) Notice: Subject to any disclaimer, the term of this patent is extended or adjusted under 35 U.S.C. 154(b) by 0 days.

(21) Appl. No.: 17/908,228

(22) PCT Filed: Jul. 8, 2022

(86) PCT No.: PCT/CN2022/104658
§ 371 (c)(1),
(2) Date: Aug. 30, 2022

(87) PCT Pub. No.: WO2024/000623
PCT Pub. Date: Jan. 4, 2024

(65) Prior Publication Data
US 2024/0213512 A1 Jun. 27, 2024

(30) Foreign Application Priority Data
Jun. 28, 2022 (CN) ........................ 202221639589.6

(51) Int. Cl.
*H01M 10/04* (2006.01)

(52) U.S. Cl.
CPC ............................... *H01M 10/0404* (2013.01)

(58) Field of Classification Search
CPC ................................................ H01M 10/0404
See application file for complete search history.

(56) References Cited

U.S. PATENT DOCUMENTS 9,333,601 B2 * 5/2016 Xie ....................... B23P 19/004
2013/0011235 A1 * 1/2013 Yoo .................. H01M 10/0431 414/789.5
2022/0149419 A1 5/2022 Lu et al.

FOREIGN PATENT DOCUMENTS

CN 110416592 A 11/2019
CN 111384427 A * 7/2020 ............ H01M 10/04
(Continued)

OTHER PUBLICATIONS

English Machine Translation for CN113903974 (Year: 2022).*
(Continued)

*Primary Examiner* — Matthew T Martin
*Assistant Examiner* — Katherine N Higgins
(74) *Attorney, Agent, or Firm* — FENWICK & WEST LLP

(57) ABSTRACT

Stacking apparatus includes: a base, a first drive element, and a limiting mechanism, the base is provided with a feeding side and a blanking side; an output end of the first drive element is in connection with the base, and the first drive element is configured for driving the rotation of the base so as to switch between the feeding side and the blanking side; the limiting mechanism is provided on the base, both the feeding side and the blanking side are provided with at least one limiting mechanism, a placement region is formed in the limiting mechanism, the limiting mechanism includes limiting plates arranged to be opposite to each other, the limiting plates are arranged to extend along a vertical direction perpendicular to the base, and at least one of the limiting plates moves relatively or oppositely, so as to adjust the length of the placement region.

8 Claims, 4 Drawing Sheets

(56) References Cited

FOREIGN PATENT DOCUMENTS

| | | | | | |
|---|---|---|---|---|---|
| CN | 113903974 A | * | 1/2022 | ........ | H01M 10/0404 |
| CN | 215885386 U | * | 2/2022 | | |
| CN | 216441126 U | | 5/2022 | | |
| CN | 115172844 A | * | 10/2022 | ........ | H01M 10/0404 |

OTHER PUBLICATIONS

English Machine Translation for CN215885386 (Year: 2022).*
English Machine Translation for CN-111384427-A (Year: 2020).*
English Machine Translation for CN-113903974-A (Year: 2022).*
English Machine Translation for CN-115172844-A (Year: 2022).*
Patent Cooperation Treaty, International Search Report, PCT Application No. PCT/CN2022/104658, Feb. 20, 2023, five pages.
Patent Cooperation Treaty, Written Opinion of the Internation Searching Authority, PCT Application No. PCT/CN2022/104658, Feb. 20, 2023, five pages.

* cited by examiner

STACKING APPARATUS

TECHNICAL FIELD

The present disclosure relates to the field of stacking and transferring apparatuses, and particularly to a stacking apparatus.

BACKGROUND ART

As batteries are applied more and more extensively, higher and higher requirements for the battery life are posed. In order to obtain longer battery life, a plurality of cell unit modules are usually stacked together to form a battery pack having a greater capacity. However, existing stacking apparatuses have a small scope of application and low compatibility, and cannot meet the requirements for existing large-scale stacking.

SUMMARY

An object of the present disclosure is to at least solve one of the technical problems existing in the prior art and provide a stacking apparatus.

According to embodiments of a first aspect of the present disclosure, a stacking apparatus is provided, which comprises: a base, a first drive element, a limiting mechanism, and a positioning mechanism, wherein the base is provided with a feeding side and a blanking side; an output end of the first drive element is in connection with the base, and the first drive element is configured for driving the rotation of the base so as to switch between the feeding side and the blanking side; the limiting mechanism is provided on the base, both the feeding side and the blanking side are provided with at least one limiting mechanism, a placement region is formed in the limiting mechanism, the limiting mechanism includes limiting plates arranged to be opposite to each other, the limiting plates are arranged to extend along a vertical direction perpendicular to the base, and at least one of the limiting plates moves relatively or oppositely, so as to adjust the length of the placement region; and the positioning mechanism includes a positioning portion extending into the placement region.

Beneficial effects are as follows. As for this stacking apparatus, the base is provided with a feeding side and a blanking side, both the feeding side and the blanking side are provided with at least one limiting mechanism. By driving the rotation of the base through the first drive element, the limiting mechanism is switched to the blanking side for blanking after the completion of the stacking at the feeding side, feeding, stacking and blanking can be performed simultaneously on the feeding side and the blanking side, wherein the efficiency can be improved. Meanwhile, a placement region for stacking is formed by oppositely arranging two limiting plates of the limiting mechanism, and at least one of the limiting plates can move relatively or oppositely, hereby enabling the length of the placement region to be adjustable. Accordingly, during actual use, the movement of the limiting plate can be adjusted according to cells of different dimensions, thereby adjusting the length of the placement region. Thus, it is adaptive for cells of different dimensions and sizes and has higher compatibility. By positioning and compressing modules through the positioning portion, the module stacking can be achieved.

In the stacking apparatus according to the embodiments of the first aspect of the present disclosure, there are four limiting mechanisms, and two limiting mechanisms are respectively provided on the feeding side and on the blanking side.

In the stacking apparatus according to the embodiments of the first aspect of the present disclosure, the limiting plate includes a bottom plate and a vertical plate, the base is provided with a linear assembly, the bottom plate is able to slide along the linear assembly, and the vertical plate is arranged to be perpendicular to the bottom plate.

In the stacking apparatus according to the embodiments of the first aspect of the present disclosure, both limiting plates are provided with a linear assembly on the bottom thereof, and the limiting plates are able to slide linearly.

In the stacking apparatus according to the embodiments of the first aspect of the present disclosure, the linear assembly includes a linear guide rail and a sliding block, the linear guide rail is provided on the base, the sliding block is able to slide along the linear guide rail, and the sliding block is arranged under the bottom plate.

In the stacking apparatus according to the embodiments of the first aspect of the present disclosure, the limiting plate is fixed by a fixing seat; the outer side of the linear guide rail is provided with several first through holes arranged along the length direction of the linear guide rail; the first through holes are arranged to be evenly distributed with an interval therebetween; a fixing portion is provided by way of protruding from the bottom of the bottom plate; and the fixing seat includes a horizontal portion and a connecting portion, wherein the horizontal portion is provided with a plurality of second through holes, the connecting portion and the fixing portion are connected fixedly via a bolt, and the first through holes and the second through holes are fixed correspondingly.

In the stacking apparatus according to the embodiments of the first aspect of the present disclosure, the positioning mechanism includes a lifting assembly, a traversing assembly, and a positioning portion, wherein the positioning portion is arranged to extend along the length direction of the limiting plate, the lifting assembly is able to drive the positioning portion to move vertically, and the traversing assembly is able to drive the positioning portion to move horizontally.

In the stacking apparatus according to the embodiments of the first aspect of the present disclosure, the positioning mechanism further includes a sliding plate and a mounting plate, wherein the sliding plate is able to be driven by the traversing assembly to slide, one end of the mounting plate is detachably arranged on the sliding plate, and the bottom of the mounting plate is evenly provided with a plurality of pressing blocks to form the positioning portion.

In the stacking apparatus according to the embodiments of the first aspect of the present disclosure, the stacking apparatus further comprises a fixing assembly provided on the top of the limiting plate, the fixing assembly includes a second drive element and a fixing plate, the second drive element is able to drive the fixing plate to be pushed out for fixing, and the fixing plate is provided with an avoidance groove corresponding to the pressing block.

In the stacking apparatus according to the embodiments of the first aspect of the present disclosure, the stacking apparatus further comprises a bearing platform, wherein one end of the bearing platform is mounted on the lifting assembly and the other end of the bearing platform extends into the placement region.

BRIEF DESCRIPTION OF DRAWINGS

The present disclosure will be further described below with reference to the accompanying drawings and the embodiments.

Figure 1:
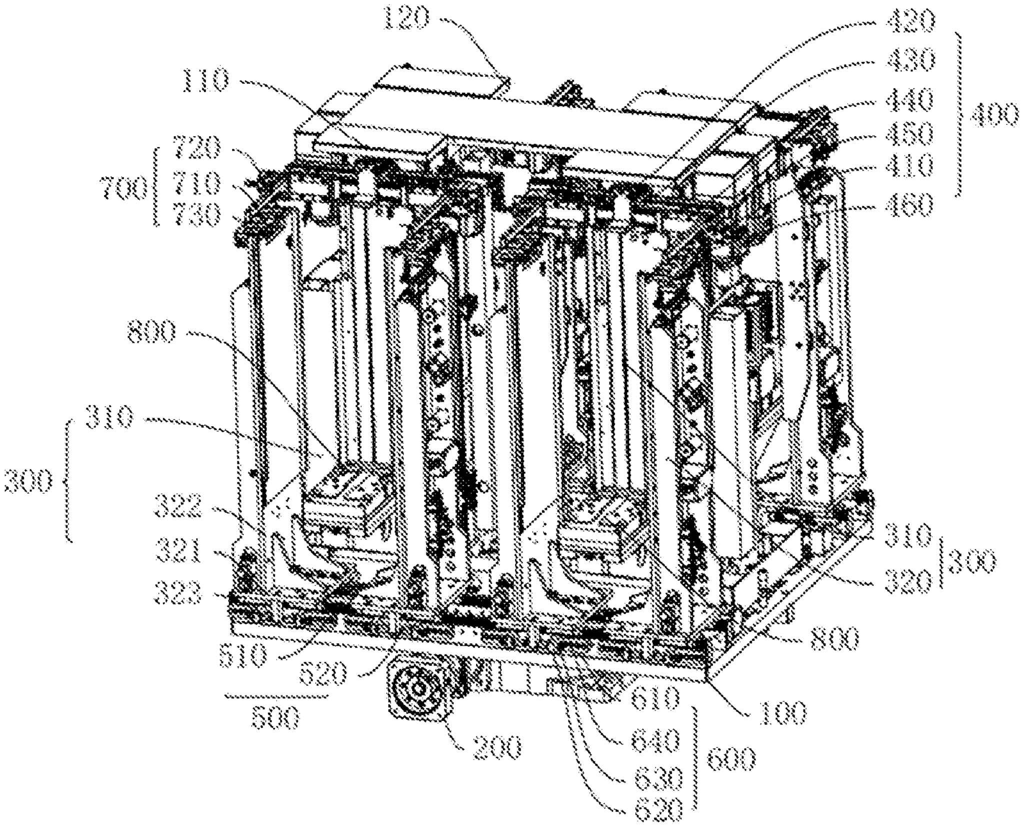
FIG. 1 is a first schematic drawing of a stacking apparatus according to an embodiment of the present disclosure.
Figure 2:
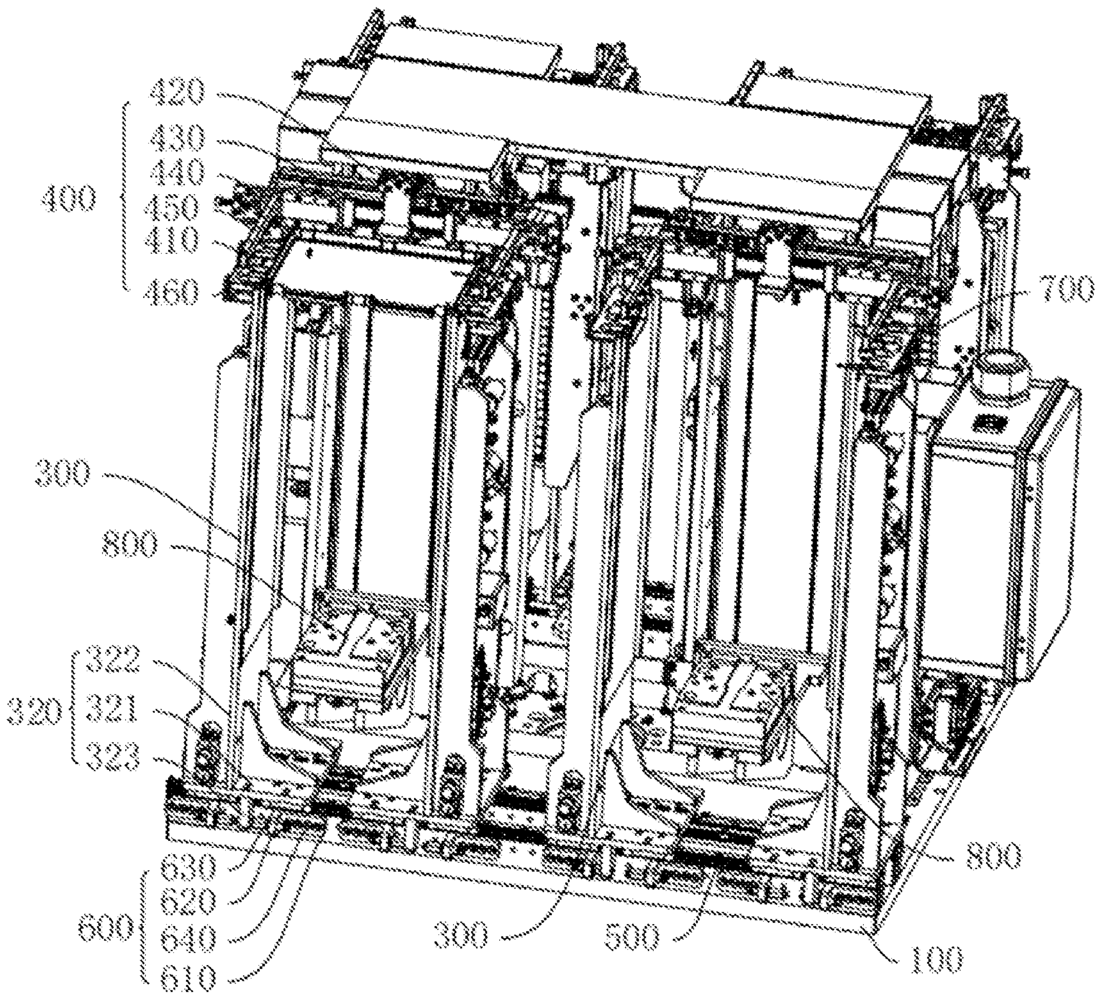
FIG. 2 is a second schematic drawing of a stacking apparatus according to an embodiment of the present disclosure.

REFERENCE SIGNS base 100, feeding side 110, blanking side 120;
first drive element 200;
limiting mechanism 300, placement region 310, limiting plate 320, bottom plate 321, vertical plate 322, fixing portion 323;
positioning mechanism 400, positioning portion 410, lifting assembly 420, traversing assembly 430, sliding plate 440, mounting plate 450, pressing block 460;
linear assembly 500, linear guide rail 510, sliding block 520;
fixing seat 600, horizontal portion 610, connecting portion 620, bolt 630, second through hole 640;
fixing assembly 700, second drive element 710, fixing plate 720, avoidance groove 730; and
bearing platform 800.

DETAILED DESCRIPTION OF EMBODIMENTS

Specific embodiments of the present disclosure will be described in detail herein, preferred embodiments of the present disclosure are shown in the accompanying drawings, and the accompanying drawings are intended to supplementarily illustrate the verbal description in the specification with graphs, such that each technical feature and the overall technical solution of the present disclosure can be understood intuitively and visually, but they cannot be construed as limiting the scope of protection of the present disclosure.

In the description of the present disclosure, it shall be understood that orientation description concerned, orientation or position relationships indicated by terms such as "upper", "lower", "front", "rear", "left", and "right", are orientation or position relationships shown based on the accompanying drawings, merely for facilitating the description of the present disclosure and for simplifying the description, rather than indicating or implying that the specified device or element must have a specific orientation, and be constructed and operated in a certain orientation, and therefore cannot be construed as limiting the present disclosure.

In the description of the present disclosure, the term "several" means one or more, the term "a plurality of" means more than two, terms "greater than", "less than", "exceeding" and the like are construed as not including this number, and terms "above", "below", "within" and the like are construed as including this number. If described, terms such as "first" and "second" are used merely for the purpose of distinguishing technical features, and cannot be construed as indicating or implying to have importance in relativity, or implicitly suggesting the number of the indicated technical features, or implicitly suggesting the precedence relationships of the indicated technical features.

In the description of the present disclosure, unless otherwise expressly defined, terms such as "provide", "mount", and "connect" should be construed in a broad sense, and specific meanings of the above terms in the present disclosure could be rationally determined by a technician skilled in the related technical field with reference to specific contents of the technical solution.

As batteries are applied more and more extensively, higher and higher requirements for the battery life are posed. In order to obtain longer battery life, a plurality of cell unit modules is usually stacked together to form a battery pack having a greater capacity. For example, soft pack battery modules have advantages of thinness, long cycle life, good safety performance, high energy density, stable discharge, excellent performance, environmental protection and no pollution, and are widely applied in various fields such as electric bicycles, electric motorcycles, electric vehicles, solar photovoltaic power generation systems, wind power generation systems, mobile communication base stations, large server stand-by UPS power sources, emergency lighting, portable power sources, and mine safety appliance. Usually, during the stacking process of assembling soft pack battery modules, due to poor compatibility of the stacking apparatus, it is necessary to provide a variety of different stacking apparatuses to meet the requirements, which is not economical.

Referring to FIG. 1, a stacking apparatus comprises: a base 100, a first drive element 200, a limiting mechanism 300, and a positioning mechanism 400. In the above, the base 100 is provided with a feeding side 110 and a blanking side 120, an output end of the first drive element 200 is in connection with the base 100, and the first drive element 200 is configured for driving the rotation of the base 100 so as to switch between the feeding side 110 and the blanking side 120.

For example, the base 100 is configured to be square, and the base 100 is divided into feeding side 110 and blanking side 120 according to the center gap in the length direction. The first drive element 200 is a motor, the motor is mounted at the bottom of the base 100 through a motor fixing seat, and the output end of the motor is in rotatable connection with the base 100. The rotation center of the base 100 is located at the central position of the base 100.

The limiting mechanism 300 is provided on the base 100, both the feeding side 110 and the blanking side 120 are provided with at least one limiting mechanism 300, a placement region 310 is formed in the limiting mechanism 300, the limiting mechanism 300 includes limiting plates 320 arranged to be opposite to each other, the limiting plates 320 are arranged to extend along a vertical direction perpendicular to the base 100, and at least one of the limiting plates 320 moves relatively or oppositely, so as to adjust the length of the placement region 310. The placement region 310 can be used for placing stacked cell modules, the placement region 310 is formed by two oppositely arranged limiting plates 320, the placement region 310 is an accommodating space extending along the upward direction from the base 100, the limiting plate 320 can limit the length of the accommodating space, and the size of the placement region 310 can be adjusted by adjusting one or both of the limiting plates 320. Of course, during blanking, the blanking can also be facilitated by adjusting and moving the limiting plate 320.

During actual use, the limiting plate 320 can firstly be adjusted to move according to the actual dimensions of a cell, such that the size of the placement region 310 substantially equals that of the cell. After placing the cell, fine adjustment can be performed, such that during actual use, the stacking apparatus can adjust the movement of the limiting plate 320 according to cells of different dimensions so as to adjust the length of the placement region 310. Thus, it is adaptive for cells of different dimensions and sizes and has higher compatibility. In addition, the limiting plate 320 can limit the positions of the edges on two opposite sides of the cell and can ensure the positional consistency of the cell.

The positioning mechanism 400 includes a positioning portion 410 extending into the placement region 310, and the positioning portion 410 can compress cell modules during the stacking, such that the cell modules maintain the compaction pressure.

In some of the embodiments, there are four limiting mechanisms 300, and two limiting mechanisms 300 are respectively provided on the feeding side 110 and the blanking side 120. Specifically, the shape of the base 100 is square, and the base 100 is divided into two equal-sized feeding side 110 and blanking side 120. A limiting mechanism 300 forms two feeding stations on the feeding side 110, a limiting mechanism 300 forms two blanking stations on the blanking side, and the limiting mechanisms located on the feeding side 110 and the blanking side 120 form four symmetrically distributed stacking regions on the base 100, double-station stacking can be realized accordingly, and the stacking efficiency of existing apparatuses can be improved.

Figure 3:
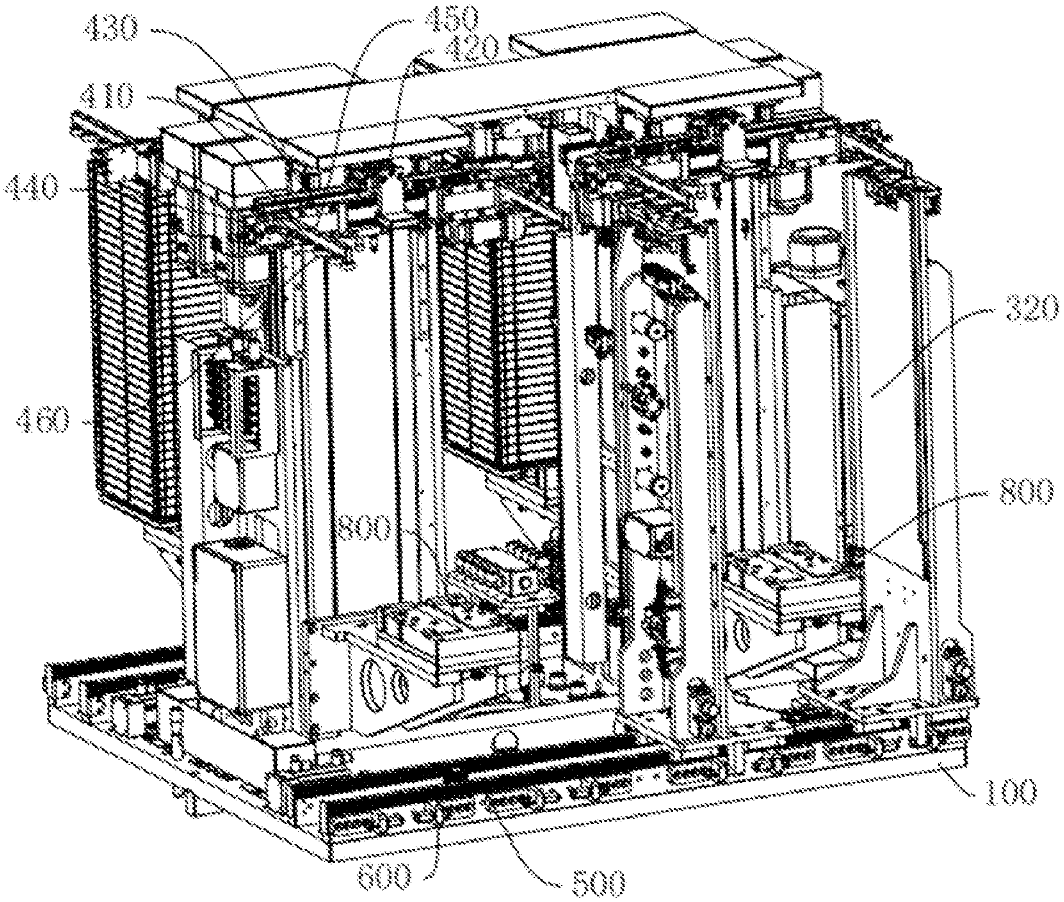
FIG. 3 is a third schematic drawing of a stacking apparatus according to an embodiment of the present disclosure.
Figure 4:
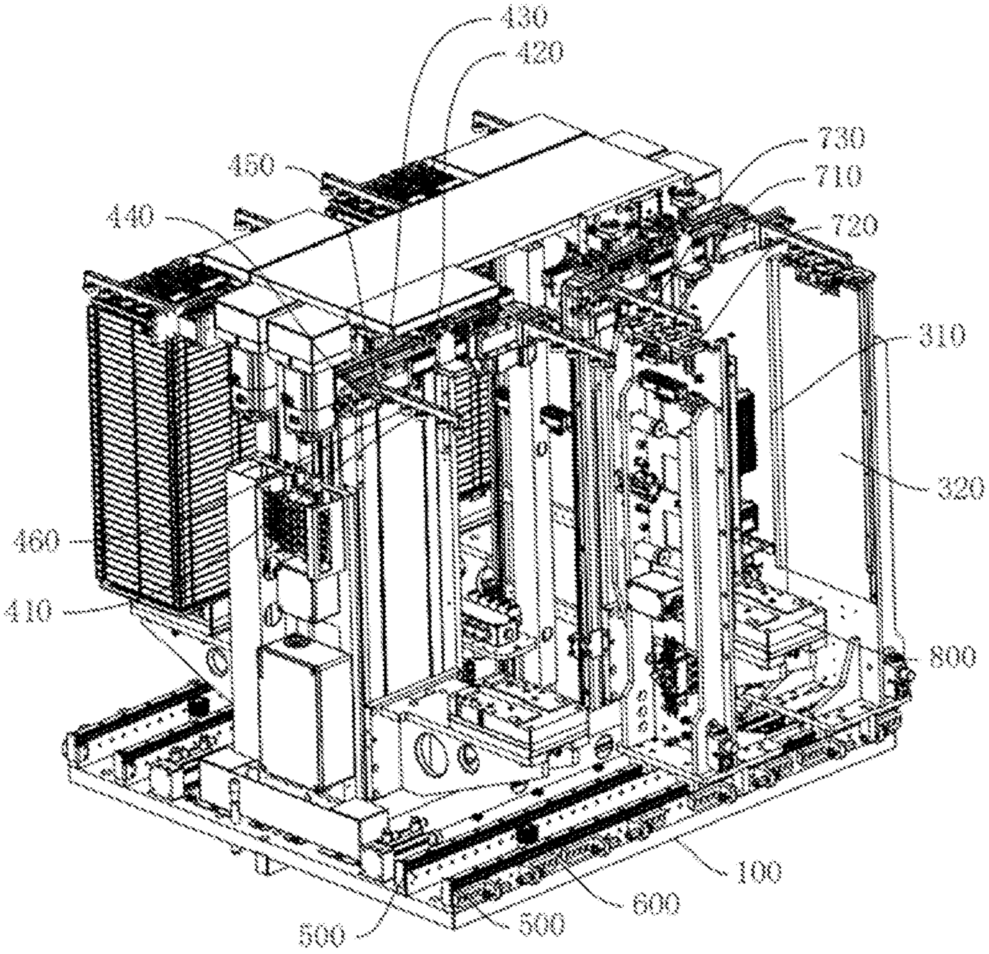
FIG. 4 is a fourth schematic drawing of a stacking apparatus according to an embodiment of the present disclosure.

Referring to FIGS. 3 and 4, the limiting plates 320 limit cell modules on both sides, and the specific structure of the limiting plate 320 includes a bottom plate 321 and a vertical plate 322. In the above, the base 100 is provided with a linear assembly 500, the bottom plate 321 can slide along the linear assembly 500, the vertical plate 322 is arranged to be perpendicular to the bottom plate 321, and the bottom plate 321 and the vertical plate 322 can be provided by way of integral molding or combined in a detachable manner. A reinforcing rib plate is provided between the bottom plate 321 and the vertical plate 322, the inner side surface (that is, the surface facing the side of the cell module) of the vertical plate 322 is configured to be planar, and both sides of the outer side surface (the surface opposite to the inner side surface) of the vertical plate 322 can be provided with peripheral plates arranged to be perpendicular to the outer side surface. The linear assembly 500 may be a guide rail sliding block or a screw rod structure.

If the linear assembly 500 is a guide rail sliding block, it includes a linear guide rail 510 and a sliding block 520, wherein the linear guide rail 510 is provided on the base 100, and the linear guide rail 510 is arranged along the length direction of the placement region 310, the sliding block 520 can slide along the linear guide rail 510, and the sliding block 520 is provided under the bottom plate 321 and accordingly can directly move the limiting plate 320, adjust the distance between the limiting plates 320, hereby adjusting the size of the placement region. The number and the dimensions of the linear guide rails 510 under the limiting plate 320 can be configured according to actual demands. Exemplarily, in the present embodiment, two guide rail sliding block structures are provided under the bottom plate 321, such that the limiting plate 320 slides more smoothly and the guide rail sliding block has better reliability.

If the linear assembly 500 is a screw rod structure, it includes a screw rod and a sliding sleeve, wherein the screw rod is provided on the base 100, and the screw rod is also arranged along the length direction of the placement region 310, the sliding sleeve is enabled to slide along the screw rod by driving the screw rod to rotate, and the bottom plate 321 can be integrally formed with the sliding sleeve or be connected therewith by welding or the like. Of course, the number and the dimensions of the screw rod structures can also be configured according to actual demands.

It is easy to understand that both the guide rail sliding block and the screw rod structure may be arranged under the bottom plate 321 of the limiting plate 320, reference can be made to the preceding contents for details, and no repetitive description will be made in detail herein.

Of course, exemplarily, in each limiting mechanism 300, one limiting plate 320 is moveable. That is to say, in the two limiting plates 320 constituting the limiting mechanism 300, a linear assembly 500 is provided under one of the liming plates 320, so as to adjust the limiting plate 320 to move close to or away from the other stationarily provided limiting plate 320. At this time, the adjustment of the placement region can also be realized, and it can be adapted to cell modules of different lengths. In addition, in the case of double-station stacking, the adjustable limiting plate 320 can be configured as limiting plate close to the outer side, which allows convenient range of movement and convenient movement.

In some of the embodiments, both limiting plates 320 are provided with a linear assembly 500 on the bottom thereof, and the limiting plates 320 are able to slide linearly. That is to say, both limiting plates 320 in each limiting mechanism 300 can slide, a linear assembly is provided respectively on the bottom of the limiting plates 320. In this way, the dimensions of the placement region 310 can not only be adjusted so as to be adapted for cell modules of different ranges. In the case of double-station stacking, the distance of the limiting mechanisms 300 located on the same side can also be adjusted.

In the above, the limiting plate 320 is fixed by a fixing seat 600; the outer side of the linear guide rail 510 is provided with several first through holes (not shown in the figures) arranged along the length direction of the linear guide rail 510; the first through holes are arranged to be evenly distributed with an interval therebetween; and a fixing portion 323 is provided by way of protruding from the bottom of the bottom plate 321, and the fixing portion 323 is a fixing block or a columnar structure and extends from the bottom surface of the bottom plate 321 to the outer side of the linear guide rail 510. The fixing seat 600 has an L-shaped structure, the fixing seat 600 includes a horizontal portion 610 and a connecting portion 620, the horizontal portion 610 and the connecting portion 620 are integrally formed and arranged, the horizontal portion 610 is provided with a plurality of second through holes 640, the horizontal portion 610 can be attached to the outer side of the linear guide rail 510, and the first through hole and the second through hole 640 can be aligned with each other and are then fastened and fixed via a bolt. In this way, after that the position of the limiting plate 320 has been adjusted, the position of the fixing seat 600 can be firstly fixed. The connecting portion 620 and the fixing portion 323 are connected fixedly via a bolt 630, and through this structure, the position of the limiting plate 320 can be fixed, the mounting and the adjustment are facilitated to a great extent, and the movement of the limiting plate 320 during use can be prevented.

The stacking apparatus further comprises a positioning mechanism 400, and the positioning mechanism 400 includes a positioning portion 410, a lifting assembly 420, and a traversing assembly 430. In the above, the positioning portion 410 is arranged to extend along the length direction of the limiting plate 320, the lifting assembly 420 can drive the positioning portion 410 to make up-and-down movement, and the traversing assembly 430 can drive positioning portion 410 to make horizontal movement. Specifically, the placement region 310 has a length direction and a width direction, the limiting plates 320 are arranged on both sides of the length direction, and the positioning portion 410 is substantially parallel to the direction of the top of the limiting plate 320. The lifting assembly 420 is provided on the side of the placement region 310 formed by the limiting plate 320; for the lifting assembly 420, a single axis manipulator (electric sliding table or single axis driver) can be adopted, which is arranged to extend along the height direction of the limiting plate 320; and the traversing assembly 430 is mounted on the single axis manipulator, and the single axis manipulator can drive the traversing assembly 430 to make up-and-down lifting motion. The traversing assembly 430 includes a motor and a linear module, the linear module is arranged along the length direction of the placement region 310, the motor can drive the linear module to move, the positioning portion 410 is mounted on the linear module through a sliding plate 440 and a mounting plate 450, and the sliding plate 440 is brought into slide through the linear module. Two sliding plates 440 are provided on both sides of the linear module, and the linear module can drive the sliding plates 440 to make relative or opposite motion, and accordingly drive the positioning portion 410 to make movement towards the middle or both sides. The mounting plate 450 can be provided on the sliding plate 440 in a detachable manner, and the bottom of the mounting plate 450 is evenly provided with a plurality of pressing blocks 460 to form the positioning portion 410. The mounting plate 450 includes a first part and a second part, the first part is fixed with the sliding plate 440, the second part is arranged to be perpendicular to the first part, the pressing plate 460 may have a circular or square shape or the like, and the pressing plate 460 can be detachably mounted at the lower part of the second part.

The stacking apparatus further comprises a fixing assembly 700 provided on the top of the limiting plate 320, the fixing assembly 700 includes a second drive element 710 and a fixing plate 720, the second drive element 710 can drive the fixing plate 720 to be pushed out for fixing, and the fixing plate 720 is provided with an avoidance groove 730 corresponding to the pressing block 460. Specifically, a motor can be adopted for the second drive element 710, the motor can be stationarily arranged on the outer side of the limiting plate 320, the fixing plate 720 can be provided at the output end of the motor, and the motor can drive the fixing plate 720 to move. The fixing plate 720 is provided with an avoidance groove 730 corresponding to the pressing block 460, the avoidance groove 730 is arranged to penetrate one side of the fixing plate 720, the avoidance groove 730 has the shape of a U-shaped groove, and the avoidance groove 730 can avoid the pressing block 460. After full stacking, the second drive element 710 begins to operate, such that the fixing plate 720 pushes a fixed frame (the outermost frame of the cell module) out, hereby completing stacking.

The stacking apparatus further comprises a bearing platform 800, wherein one end of the bearing platform 800 is mounted on the lifting assembly 420 and the other end of the bearing platform 800 extends into the placement region 310. The bearing platform 800 can be provided in the placement region 310, cell modules are stacked on the bearing platform 800, and the lifting assembly 420 can drive the bearing platform 800 to move, and the bearing platform 800 can be adjusted so as to be adapted for different stacking requirements.

The embodiments of the present disclosure are described in detail above with reference to the accompanying drawings. However, the present disclosure is not limited to the above embodiments, and within the scope of knowledge possessed by an ordinary technician skilled in the technical field, various modifications could further be made without departing from the purpose of the present disclosure.

The invention claimed is:

1. A stacking apparatus comprising:

a base, provided with a feeding side and a blanking side;

a first drive element, wherein an output end of the first drive element is in connection with the base, and the first drive element is configured for driving a rotation of the base so as to switch between the feeding side and the blanking side;

a limiting mechanism, provided on the base, wherein both the feeding side and the blanking side are provided with at least one limiting mechanism, a placement region is formed in the limiting mechanism, the limiting mechanism comprises limiting plates arranged to be opposite to each other, the limiting plates are arranged to extend along a vertical direction perpendicular to the base, and at least one of the limiting plates moves relatively or oppositely, so as to adjust the length of the placement region; and a positioning mechanism, comprising a positioning portion extending into the placement region, wherein the positioning portion is configured to compress cell modules during a stacking, the positioning mechanism comprises a lifting assembly and a traversing assembly, a positioning portion is arranged to extend along a length direction of the limiting plates, the lifting assembly is able to drive the positioning portion to move vertically, and the traversing assembly is able to drive the positioning portion to move horizontally; and a bearing platform, wherein one end of the bearing platform is mounted on the lifting assembly, and the other end of the bearing platform extends into the placement region, wherein the cell modules are stacked on the bearing platform, and the bearing platform is driven by the lifting assembly to move.

2. The stacking apparatus according to claim 1, wherein four limiting mechanisms are provided, and two limiting mechanisms are respectively provided on the feeding side and on the blanking side.

3. The stacking apparatus according to claim 1, wherein each of the limiting plates comprises a bottom plate and a vertical plate, the base is provided with a linear assembly, the bottom plate is able to slide along the linear assembly, and the vertical plate is arranged to be perpendicular to the bottom plate.

4. The stacking apparatus according to claim 3, wherein both limiting plates are provided with the linear assembly on a bottom thereof, and the limiting plates are able to slide linearly.

5. The stacking apparatus according to claim 3, wherein the linear assembly comprises a linear guide rail and a sliding block, the linear guide rail is provided on the base, the sliding block is able to slide along the linear guide rail, and the sliding block is arranged under the bottom plate.

6. The stacking apparatus according to claim 5, wherein each of the limiting plates is fixed by a fixing seat; an outer side of the linear guide rail is provided with several first through holes arranged along a length direction of the linear guide rail; the first through holes are arranged to be evenly distributed with an interval therebetween; a fixing portion is provided by way of protruding from a bottom of the bottom plate; and the fixing seat comprises a horizontal portion and a connecting portion, wherein the horizontal portion is provided with a plurality of second through holes, the connecting portion and the fixing portion are connected fixedly via a bolt, and the first through holes and the second through holes are fixed correspondingly.

7. The stacking apparatus according to claim 1, wherein the positioning mechanism further comprises a sliding plate and a mounting plate, wherein the sliding plate is able to be driven by the traversing assembly to slide, one end of the mounting plate is detachably arranged on the sliding plate, and a bottom of the mounting plate is evenly provided with a plurality of pressing blocks to form the positioning portion.

8. The stacking apparatus according to claim 7, wherein the stacking apparatus further comprises a fixing assembly provided on a top of the limiting plates, the fixing assembly comprises a second drive element and a fixing plate, the second drive element is able to drive the fixing plate to be pushed out for fixing, and the fixing plate is provided with an avoidance groove corresponding to the pressing blocks.

* * * * *